Fig_1.

Oct. 22, 1935.  R. M. MAGNUSON  2,018,371
ELECTRIC MOTOR AND PUMP HEAD
Filed Oct. 2, 1933   2 Sheets-Sheet 2

INVENTOR.
Roy. M. Magnuson.
BY Philip A. Minnis
ATTORNEY.

Patented Oct. 22, 1935

2,018,371

UNITED STATES PATENT OFFICE 2,018,371

ELECTRIC MOTOR AND PUMP HEAD

Roy M. Magnuson, San Jose, Calif., assignor to Food Machinery Corporation, San Jose, Calif., a corporation of Delaware Application October 2, 1933, Serial No. 691,866

7 Claims. (Cl. 172—36)

This invention pertains to electric motors and, more particularly, to vertical shaft motors for deep-well turbine pumps.

The object of the invention is to improve upon the design of motors for deep-well turbine pump service, both from the standpoint of economy of manufacture and from the standpoints of ruggedness, rigidity, accessibility, and operating efficiency. In brief, the present invention is the outcome of a studied effort to improve upon pump motor design as far as possible in the light of experience.

One of the important features of this invention resides in the design of the motor housing, which functions as usual as a support for the field structure and rotor, and, in addition, as a pump head—the housing being cast with a water jacket through which water circulates on its way from the pump. Thus, effective water-cooling of the motor is accomplished incidentally—that is, without the provision of a supplemental water circulating and cooling system.

Another outstanding feature of the invention lies also in the arrangement of the motor housing—the design being such that all critical machining operations on the housing, which determine the accuracy of alignment and concentricity of relatively moving parts, can be accomplished at a single set-up in the lathe or boring mill. This not only obviates possible inaccuracies due to re-setting, but effects a very considerable saving in the cost of production.

Still another important feature lies in the very considerable lowering of the center of gravity, which is brought about in part by incorporating the pump head in the motor housing and in part by a radical departure from previous designs—the rotor being carried on anti-friction bearings mounted upon a fixed axle which forms an integral part of the motor housing. This permits of much greater compactness than has heretofore been achieved and permits of the rotor bearings being mounted very close to the rotor, thus tending to reduce vibration, which is also one of the desirable results flowing from the lowered center of gravity.

The previous approved practice in deep-well turbine pump motor design has entailed mounting the rotor on a hollow shaft which, in turn, was supported in anti-friction bearings relatively remote from the rotor. The present invention avoids the use of a hollow shaft and thereby effects still another saving.

It being substantially easier to achieve a high degree of accuracy in machining the motor housing, and the rotor being more firmly mounted than in previous designs, it is practicable to utilize a shorter magnetic air gap between the rotor and field pole faces and this results in improved electrical efficiency.

Another feature of consequence is the improved accessibility of the internal parts of the motor for inspection, replacement and repair.

Still another feature consists in a combined water and air cooling system—the motor being provided with a water jacket by which the major cooling is effected, and a fan attached to the rotor by the operation of which certain parts, relatively remote from the water jacket, are maintained at a safe temperature. Neither cooling media (water nor air) is adequate because air cooling cannot economically be made sufficient to dissipate all the excess heat which may be generated, and water cooling is not adapted to effect sufficient cooling of all the affected parts such as the field windings, although it will dispose of the bulk of the heat generated in those parts.

A vertical shaft motor, designed for heavy duty deep-well turbine pump operation and embodying the several aforementioned novel features, will now be described with reference to the accompanying drawings, wherein.

Figure 1:
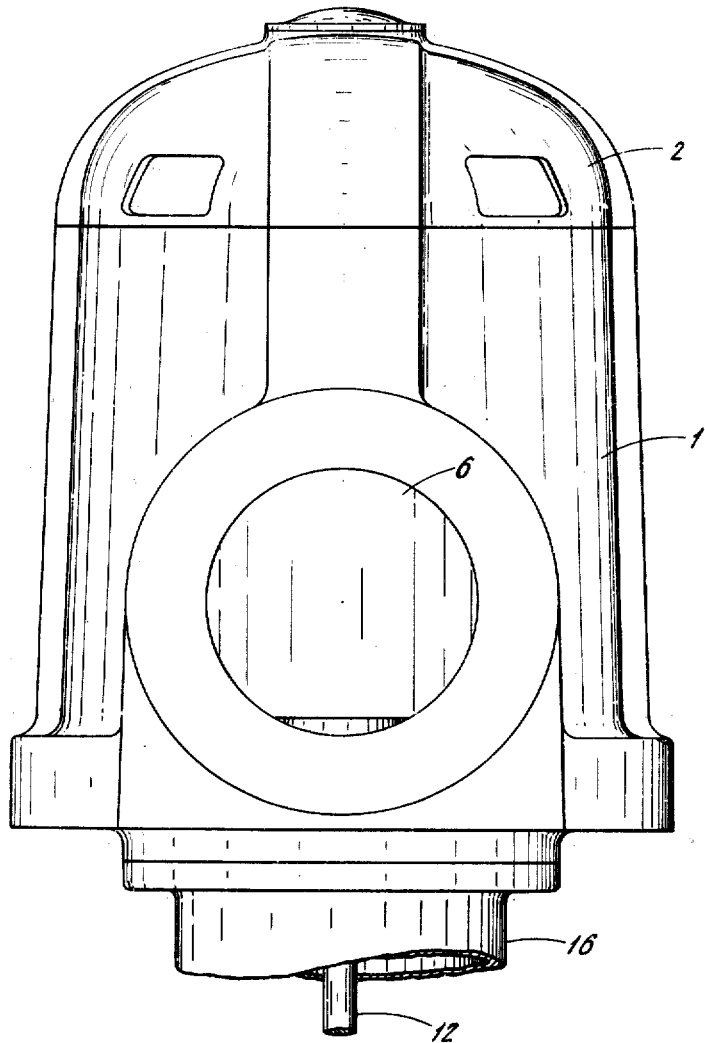
Fig. 1 is an external elevational view.

The machine illustrated is, electrically, a conventional three-phase induction motor with squirrel cage rotor; but so far as the present invention is concerned it could equally well be some other type of motor, either direct or alternating current.

The major constituent elements of the machine comprise a cast iron housing 1, a cast iron cover 2, a magnetic field structure 3, and a rotor 4.

The housing 1 serves both as an enclosure and as a supporting structure for the field and rotor. It is formed with a flanged intake opening 5, a flanged discharge opening 6, a water jacket 7, an air discharge port 8, and an integral re-entrant portion 9 which serves as a fixed axle upon which the rotor 4 is mounted through the medium of anti-friction bearings 10 and 11. A power transmitting shaft 12, connected at its lower end (not shown) to a turbine pump, extends through the fixed axle 9, and is rotatably journalled in a bearing bushing 18 mounted within the axle. The shaft is connected to one side of the rotor through the medium of a non-reversible coupling comprising a flange 13 and pins 14. The shaft 12 is keyed to the flange 13 and supported thereon by means of nut 15.

The motor is shown mounted on a well casing 16 at the intake port 5, and it will be evident that water forced upwardly by the pump below (not shown) will enter the housing through the intake opening 5 and will pass out through the discharge opening 6, meanwhile circulating in part through the water jacket 7. The fluid passageway interconnecting intake and discharge ports 5 and 6, as well as the water jacket 7, are completely isolated from the electrical parts of the machine as can easily be seen.

It will be observed that the motor housing functions not only as an enclosure and support for the electrical and moving parts of the motor, but also as a pump head—it being unnecessary with a motor of this design to provide a separate pump head as in prior conventional practice.

Figure 2:
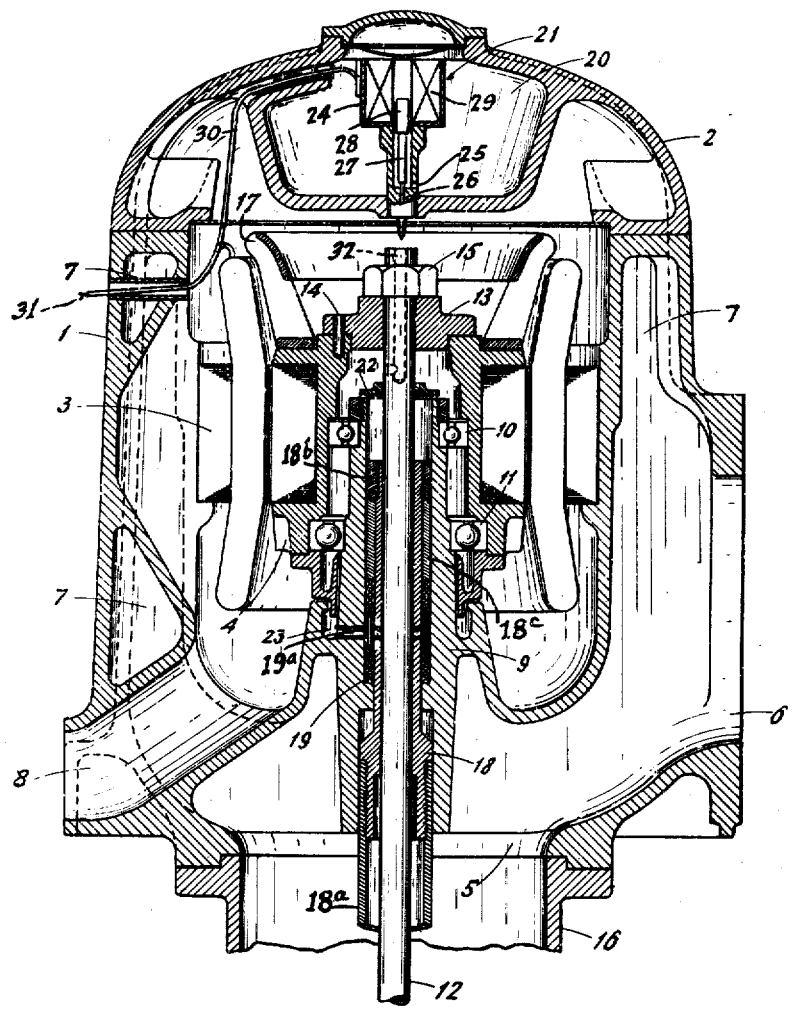
Fig. 2 is a vertical sectional view taken at right angles to Fig. 1.

It is apparent from an examination of Fig. 2 that all the critical machining operations on the housing 1 which determine the accuracy of alignment and concentricity of the relatively moving parts, and likewise the degree of uniformity with which the load is applied to the bearings, can be accomplished at a single setting of the casting in a boring mill or lathe. The critical machining operations to which reference is made comprise the boring of the annular portion of the housing to receive the magnetic field structure and the turning and facing operations on the re-entrant fixed axle 9. In the absence of any warping of the casting, which, by the way, should preferably be annealed to remove internal strains, it will be evident that the several turned and bored surfaces, all being made at one set-up, are certain to be concentric to a high degree of precision, and the faced surfaces supporting the bearing races are equally certain to be perfectly at right angles to the turned surfaces and the axis of rotation of the rotor. Hence, assuming that the field and rotor elements are accurately made, the magnetic air gap will be exceedingly uniform and the load on the bearings will be uniformly applied.

Due in part to the high degree of accuracy attainable in the machining of the housing and in part to the rigidity of the rotor support, the motor may have a considerably shorter magnetic air gap than would otherwise be practicable. As a result, the electrical efficiency is considerably increased.

It will be noted that the bearings 10 and 11 are in direct engagement with the rotor and that the fixed axle 9 is quite short and extremely rugged. These factors, coupled with the further fact that the center of gravity of the machine is comparatively very low, result in a machine in which vibration is materially reduced. This, of course, further facilitates the practicability of a short magnetic air gap and adds substantially to the life of the machine.

As an adjunct to the water cooling system the machine may be and is preferably provided with a fan 17 mounted on the rotor which serves to create a downwardly circulating current of air, which enters through openings in the cover 2 and is discharged through the opening 8. The air cooling is especially efficacious with respect to those parts farthest removed from the water jacket and particularly the outer turns of the field windings. The insulation of these windings is, of course, susceptible of rapid impairment when subjected to excessive temperature, and it is impracticable, for electrical reasons, to place them in close enough proximity to the water jacket to secure the desirable degree of heat dissipation through that medium. Hence the auxiliary air cooling is greatly to be desired, even though not indispensable.

Continuous automatic lubrication of the motor bearings is provided through an oil reservoir 20 and an electrically actuated automatic lubricator 21, which is brought into operation simultaneously with the starting up of the motor. The lubricator 21 includes a casing 24 having an oil inlet 25 and a discharge passage 26 controlled by a needle valve 27 which is actuated by the core 28 of a solenoid including a winding 29. The winding 29 of the solenoid is electrically connected through a cable 30 with the supply leads 31 of the motor, which project through the housing 1 for connection to a power line.

The weight of the solenoid core 28 normally holds the needle valve 27 seated, thereby preventing discharge of oil, but when the motor is energized the solenoid is likewise energized to lift the valve from its seat and permit oil to flow through the passage 26. The oil then drips into a passageway 32 drilled in the upper end of shaft 12, from which it emerges at a point above disc 22 which disperses it by centrifugal force, causing it to flow to bearing 10 and in turn to bearing 11, from which it passes through a channel 23 back to the surface of shaft 12 where it lubricates the bearing provided by bushing 18, thereafter flowing down the shaft to the bearings below ground, not shown in the drawings.

It is to be noted that the bearing bushing 18 is screwed into and forms an extension of the customary shaft protective tubing 18a which surrounds the drive shaft 12 and extends downwardly into the well where it is fastened at its lower end in the usual manner to the pump bowls (not shown). This shaft protective tubing serves to isolate the drive shaft from the water flowing through the discharge column 16, and as it is frequently of great length and weight it must be kept properly tensioned to take up any bending or buckling which may cause binding of the lower shaft bearings on the shaft 12 with consequent excessive wear on both shaft and bearings and added load on the motor.

Tension adjustment of the tubing 18a is accomplished in the construction illustrated by an adjustable take-up mechanism disposed within the axle 9 so as to be accessible through the upper end of the axle for adjustment. Such take-up mechanism includes the bearing bushing 18 and a nut 18b screwed onto its upper end into engagement with a spacer sleeve 18c which surrounds the bushing 18 and bears against packing 19, which in turn rests upon an annular shoulder within the axle. The packing 19 prevents the water which flows through the housing 1 under pressure from forcing its way into the working parts of the motor along the outside of the bearing bushing 18, and said packing may include a lantern ring 19a to permit the escape of water into the channel 23 for escape into and through the air duct 8 should the shaft protective tubing 18a happen to spring a leak for any reason and allow water to be forced into it and upwardly along the shaft 12 into the bearing bushing 18.

By the construction just described it will be apparent that the adjusting nut 18b is readily accessible through the upper end of the axle 9 upon removal of the cover 2, flange 13 and disc 22, whereupon, by the insertion of a suitable tool into the axle the nut can be adjusted to increase or decrease the tension of the tubing 18a as desired.

The arrangement of the take-up mechanism within the axle 9 in the manner illustrated is of considerable practical importance, in that it not only is thereby made readily accessible, but also contributes to the compactness of the discharge head since it is not necessary to provide space for the adjusting mechanism intermediate the discharge head and the top of the discharge column.

While I have illustrated and described a preferred embodiment of my invention it will be apparent to those skilled in the art that various modifications and variations may be resorted to without departing from the spirit of the invention, and I deem myself entitled to all such variations and modifications as fall within the scope of the claims appended hereto.

What is claimed is,

1. An electric motor comprising a vertical housing, a stator secured therewithin, a fixed hollow reentrant axle projecting centrally upward into said housing from the lower portion thereof, bearing means mounted on said axle externally thereof, an axially bored rotor surrounding said axle and directly journalled on said bearing means, a drive shaft secured to said rotor and projecting downwardly through said axle, a shaft protective tubing surrounding said drive shaft and projecting upwardly into said axle, and a take-up means for said protective tubing disposed within said axle and accessible through the upper end of the axle.

2. An electric motor comprising a vertical housing, a stator secured therewithin, a fixed hollow reentrant axle projecting centrally upward into said housing from the lower portion thereof, bearing means mounted on said axle externally thereof, an axially bored rotor surrounding said axle and directly journalled on said bearing means, a drive shaft secured to said rotor and projecting through said axle, a bearing for said drive shaft mounted within said axle, means for feeding oil to said first mentioned bearing means, and means for receiving oil from said bearing means and conducting it through said axle to lubricate said shaft bearing.

3. An electric motor comprising a vertical housing, a stator secured therewithin, a fixed hollow reentrant axle projecting centrally upward into said housing from the lower portion thereof, bearing means mounted on said axle externally thereof, an axially bored rotor surrounding said axle and directly journaled on said bearing means, a drive shaft secured to said rotor and projecting through said axle, said drive shaft having an oil passageway therethrough for conducting oil to said bearing means, a bearing for said drive shaft mounted within said axle, means for feeding oil into the passageway in said shaft, and means for receiving oil from said first mentioned bearing means and conducting it through said axle to lubricate said shaft bearing.

4. A combined electric power unit and discharge head for deep well turbine pumps, comprising a housing having an intake port for registration with the upper end of the discharge column of a well, and a discharge port for discharging liquid pumped through the housing, an enclosure within said housing around which liquid may flow as it passes through the housing, said enclosure forming a motor cavity isolated from liquid in the housing and open to the atmosphere for ventilation, an electric motor mounted within said cavity, and a drive shaft operatively associated with said motor and projecting downwardly through said enclosure and housing for supplying power to a pump.

5. A combined electric power unit and discharge head for deep well turbine pumps comprising a housing having an intake port for registration with the upper end of the discharge column of a well, and a discharge port for discharging liquid pumped through the housing, an enclosure within said housing around which liquid may flow as it passes through the housing, said enclosure forming a motor cavity isolated from liquid in the housing, a stator secured within said enclosure, a fixed hollow axle projecting upwardly from the bottom of the enclosure centrally of the motor cavity, a rotor journalled for rotation about said axle, a drive shaft secured to said rotor and projecting downwardly through said axle for supplying power to a pump, a shaft protective tubing surrounding said drive shaft and projecting upwardly into said axle, and a take-up means for said protective tubing disposed within said axle and accessible through the upper end of the axle.

6. A combined electric power unit and discharge head for deep well turbine pumps, comprising a housing having an intake port for registration with the upper end of the discharge column of a well, and a discharge port for discharging liquid pumped through the housing, an enclosure within said housing around which liquid may flow as it passes through the housing, said enclosure being open at its upper end and forming a motor cavity isolated from liquid in the housing, a cover for said enclosure opening, said cover being removable to permit access to said motor cavity, an electric motor mounted within said cavity, and a drive shaft operatively associated with said motor and projecting downwardly through said enclosure and housing for supplying power to a pump.

7. An electric motor comprising a vertical housing, a stator secured therewithin, a fixed hollow reentrant axle projecting centrally upward into said housing from the lower portion thereof, bearing means mounted on said axle externally thereof, an axially bored rotor surrounding said axle and directly journalled on said bearing means, a drive shaft secured to said rotor and projecting through said axle, a bearing for said drive shaft, means for feeding oil to said first mentioned bearing means, and means for receiving oil from said bearing means and conducting it through said axle for delivery to said shaft bearing.

ROY M. MAGNUSON.